A. S. SACKETT.
Improvement in Apparatus and Process for Preparing Grain for Grinding.
No. 129,906.  Patented July 30, 1872.
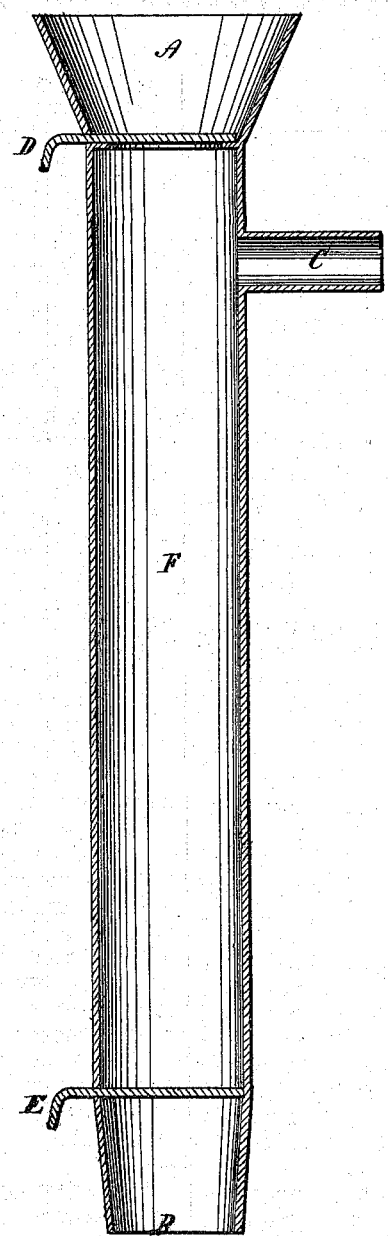
WITNESSES:
INVENTOR:

UNITED STATES PATENT OFFICE.

ASAHEL SMITH SACKETT, OF ROCHESTER, MINNESOTA.

IMPROVEMENT IN APPARATUS AND PROCESSES FOR PREPARING GRAIN FOR GRINDING.

Specification forming part of Letters Patent No. 129,906, dated July 30, 1872.

SPECIFICATION.
*To all whom it may concern:*

Be it known that I, ASAHEL SMITH SACKETT, of Rochester, in the county of Olmstead and in the State of Minnesota, have invented a certain new and useful Improved Steam Process for Cleaning Grain; and I do hereby declare that the following is a full, clear, and exact description thereof, reference being had to the accompanying drawing making a part of this specification, the letters of reference marked thereon indicating the several parts of the structure used in my improved steam process for cleaning grain.

The nature of my invention relates, first, to an apparatus for steaming grain in mass; and consists in the construction of a steam-tight tube having funnel-shaped receiving and discharging ends, and provided with two slide-valves, one near the top and the other near the bottom, and also with a side opening and offset, to which is attached a pipe for the introduction of steam into said tube; and, second, in an improved process for cleaning and preparing grain for grinding, all of which will be hereinafter more fully described.

To enable others skilled in the arts to make and use my invention, I will now proceed to more fully describe its construction and operation.

In the drawing my invention is illustrated by a vertical section, the letter F indicating a large steam-tight tube, made of any suitable material, wherein the grain to be moistened by the steam is to flow. A is the funnel-like receiving-end of the tube F to receive the grain to be cleaned, and B is the cone-shaped discharging-end of the tube directing the steamed grain into the desired receptacle. D is the top valve and E the bottom valve of the tube F. C is the steam-pipe, by means of which the steam passes from where it is generated into the tube F.

In operating my invention, the apparatus having been constructed as above-described and firmly secured in convenient relation to the steam-source and the grain that is to be cleaned of the dust, smut, and other matter accumulated while in the stack or sweating in the bin, the slide-valve E is closed so as to shut up the lower end of tube F, and the slide-valve D is opened so as to permit the uncleaned grain to flow into the tube F until it is filled. When the tube F has been filled with grain the valve D is closed, and the charge of grain to be cleaned by my process is contained in tube F between valves D and E. Then the steam is let in through the steam-pipe C, not at a very high temperature. The steam flows through the mass of grain between the valves in tube F, and by the combined action of its heat and moisture disintegrates what smut, dust, or other foul matters may be adhering to the grain without destroying the hull of the grain. When the grain has been thus steamed a sufficient time the steam-supply is cut off, the slide-valve E withdrawn, and the cleaned grain is discharged from tube F. The above-described actions are repeated until the whole amount of grain to be cleaned has passed through the steaming process. After the grain has been steamed as described it is kiln-dried and then put through a smutter or other suitable grain-cleaning machine, solely for the purpose of removing any extraneous matter disintegrated by the steaming process or still adhering to the outer skin or true husk of the kernels of grain, and not for decorticating or removing such husk, as has been heretofore done.

Having thus fully described my invention, what I claim as new, and desire to secure by Letters Patent, is—

1. The improved grain-steaming apparatus, consisting of the steam-tight tube F A B, steam-induction pipe C, and slide-valves D and E, all constructed and arranged to operate in the manner specified, and for the purpose set forth.

2. The improved process of steaming and cleaning grain preparatory to grinding without injury to or removing the outer coating or true husk of the kernels, substantially as described.

In testimony that I claim the above-described certain new and useful improved steam process for cleaning grain I have hereunto signed my name.

ASAHEL SMITH SACKETT.

Witnesses:
F. E. SMITH,
C. E. SMITH.